5 Sheets--Sheet 1.
C. VAN HAAGEN.
Machines for Cutting and Shaping Metals.
No. 5,996. Reissued Aug. 4, 1874.
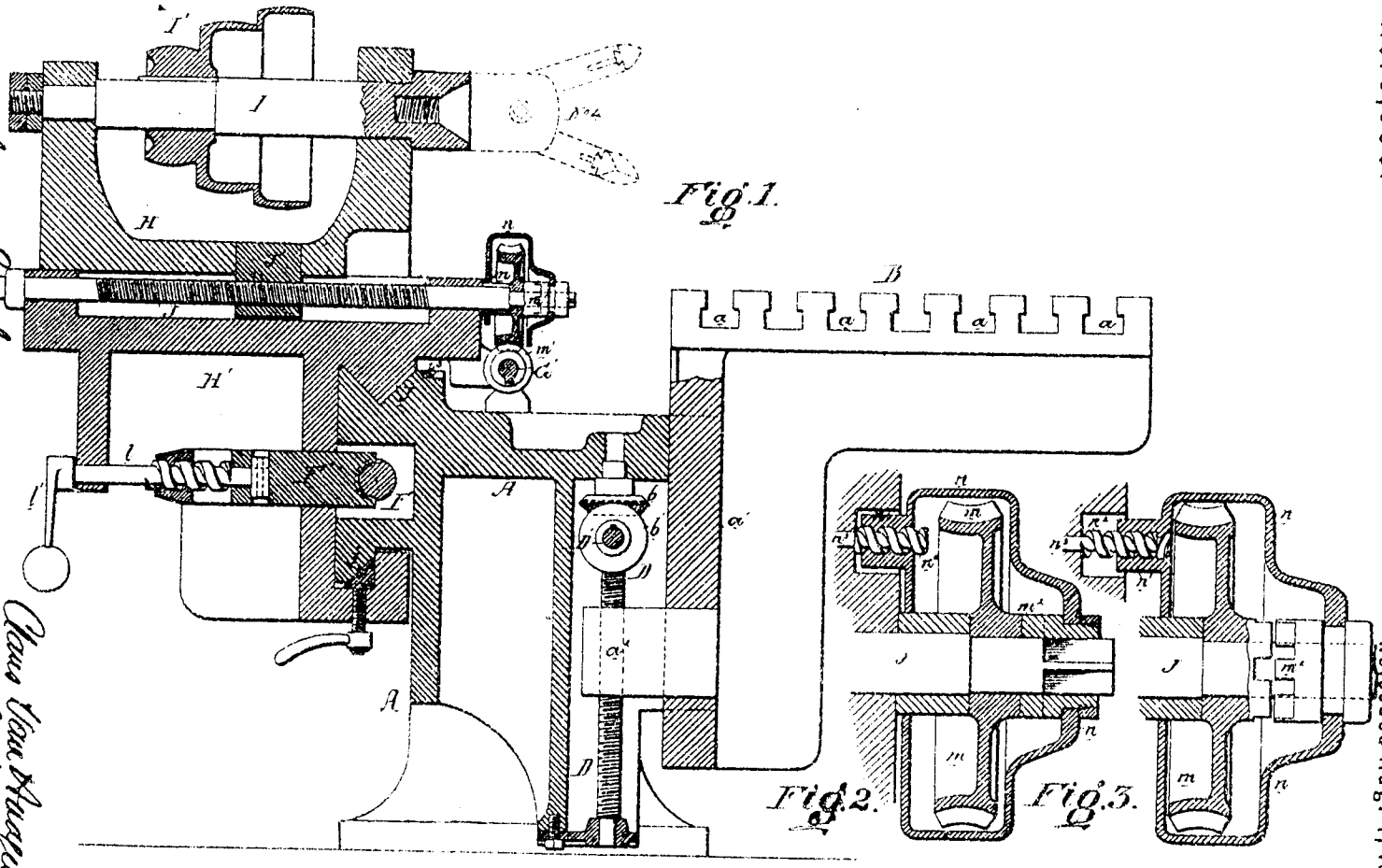
Witnesses: Harry Smith
Thos. M. Ilvaine
Claus Van Haagen
By his Attys.
Howson and Son.

C. VAN HAAGEN.
Machines for Cutting and Shaping Metals.
No. 5,996. Reissued Aug. 4, 1874.
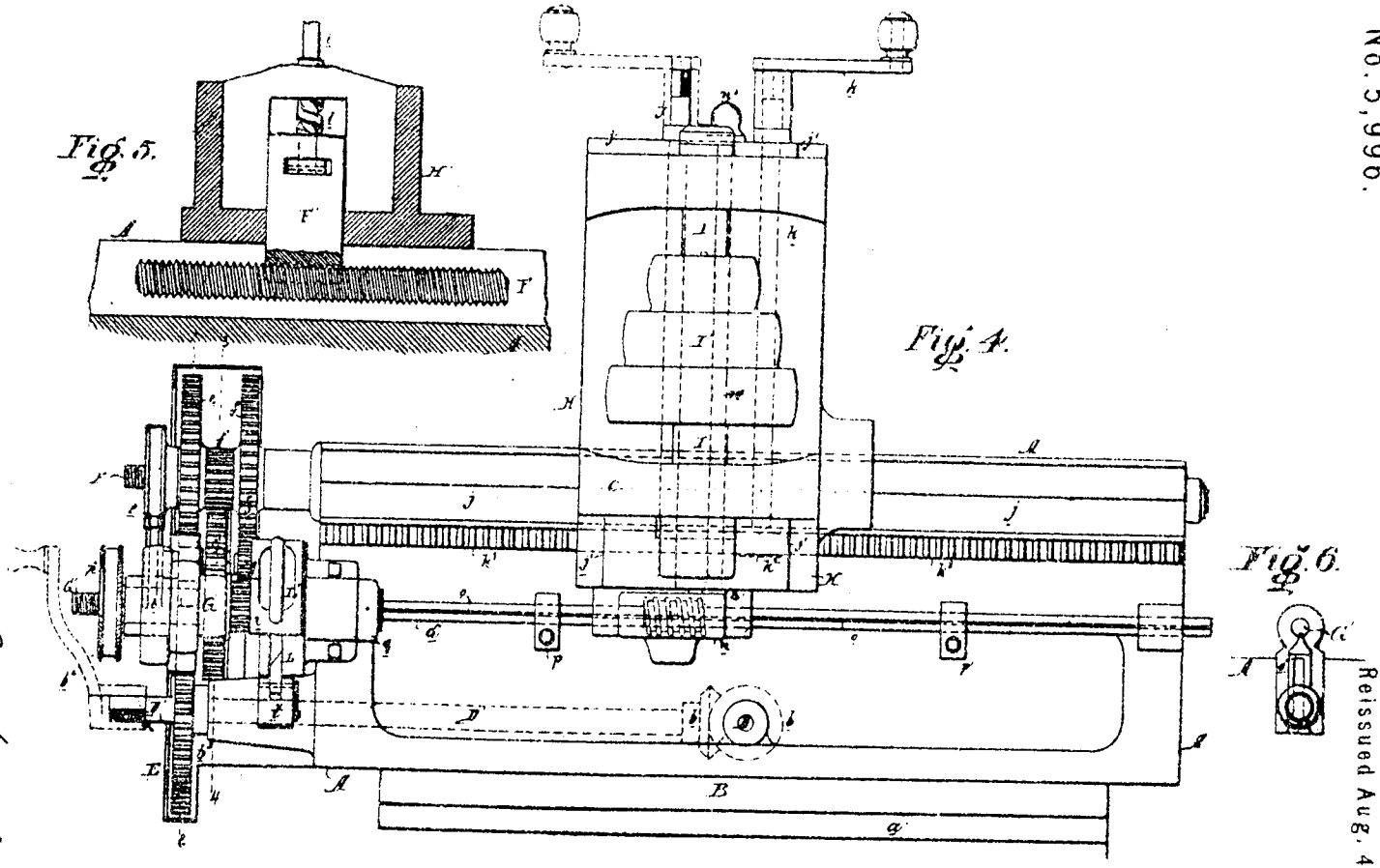
Witnesses, Harry Smith
Thomas McIlvaine
Claus Van Haagen
By his Attys
Howson and Son 5 Sheets--Sheet 3.
C. VAN HAAGEN-
Machines for Cutting and Shaping Metals.
No. 5,996. Reissued Aug. 4, 1874.
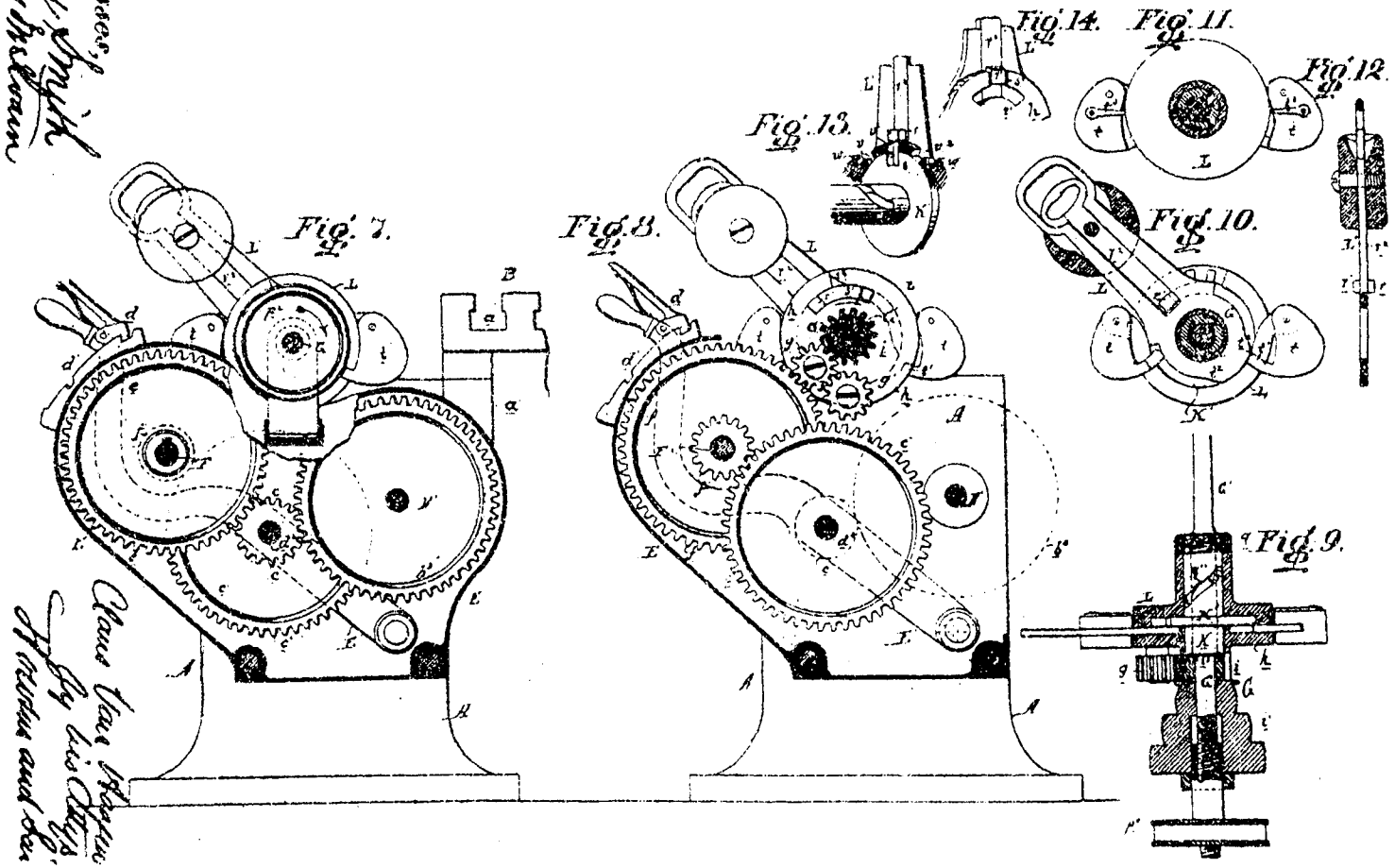
Witnesses,
Harry Smith
Thomas McLean
Claus Van Haagen
By his Attys.
Howson and Son

C. VAN HAAGEN.

Machines for Cutting and Shaping Metals.

No. 5,996. Reissued Aug. 4, 1874.

Witnesses, Harry Smith, Thomas McIlvain

Claus Van Haagen By his Attys. Howson and Son.

C. VAN HAAGEN.

Machines for Cutting and Shaping Metals.

No. 5,996.

Reissued Aug. 4, 1874.

Witnesses. Harry Smith
Thomas McTwain

Claus Van Haagen
By his Attys.
Howson and Son.

5,996. MACHINES FOR CUTTING AND SHAPING METALS. Claus Van Haagen, Philadelphia, Pa., assignor to himself and A. Van Haagen. Patent No. 110,609, dated Dec. 27, 1870. [Filed June 5, 1874.]

*To all whom it may concern:*

Be it known that I, CLAUS VAN HAAGEN, of Philadelphia, Pennsylvania, have invented Improvements in Machines for Cutting and Shaping Metals, of which the following is a specification:

My invention relates to mechanism, too fully described hereafter to need preliminary explanation, for planing, boring, turning, and grooving metals; the main object of my invention being to provide machine-shops, and especially repairing-shops, with a tool for a variety of purposes which have heretofore required separate machines.

Figure 15:
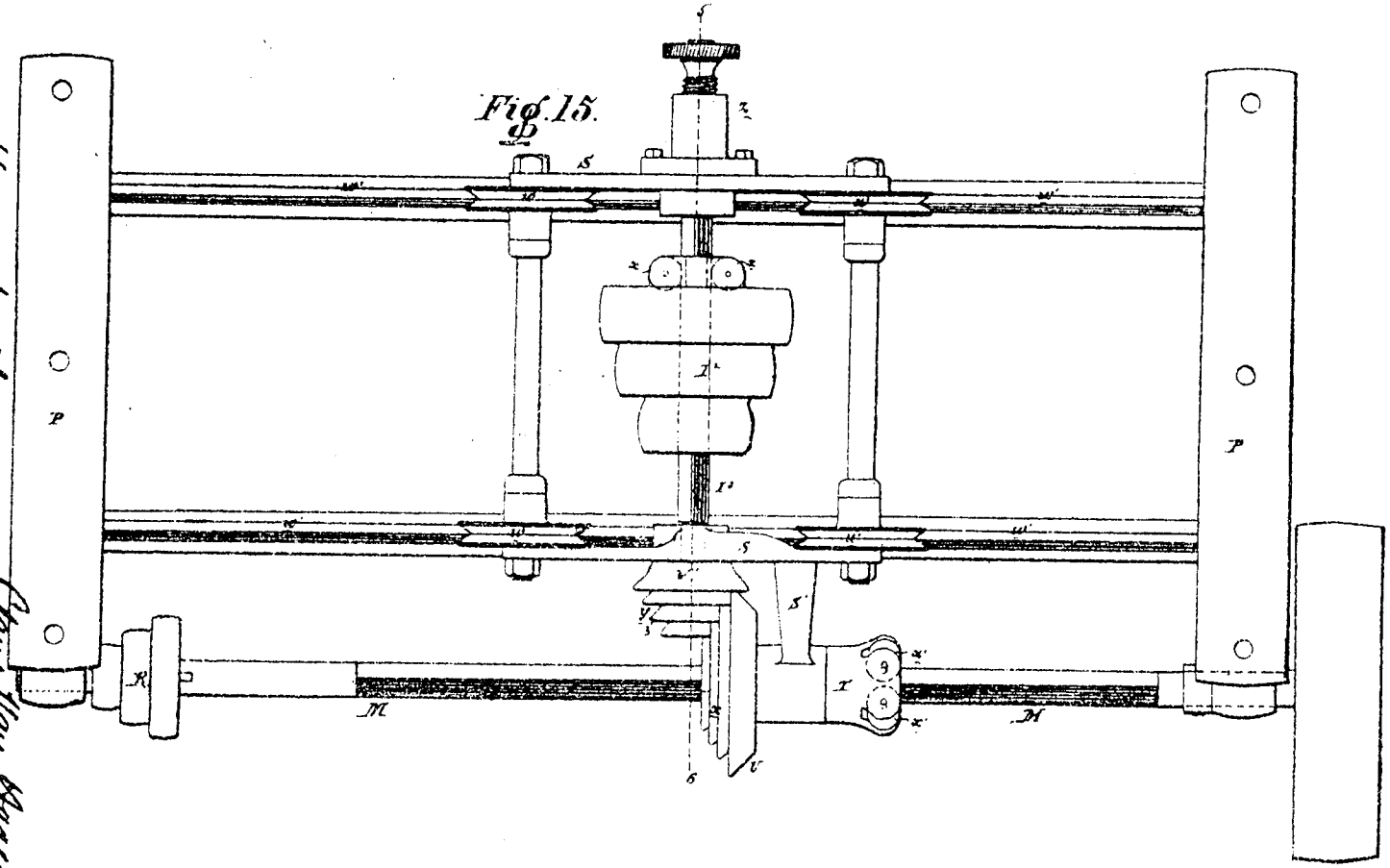
Figure 16:
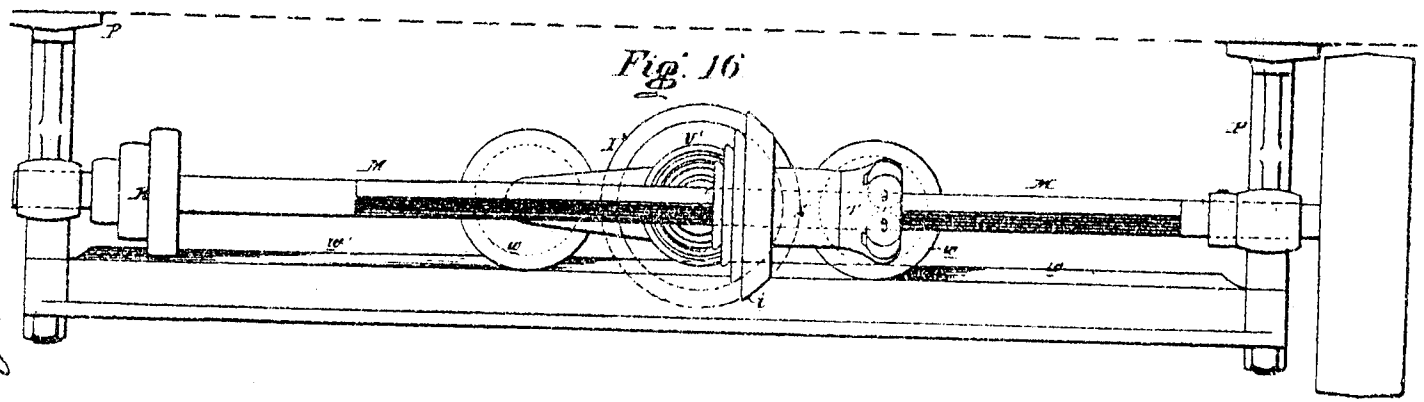
Figure 18:
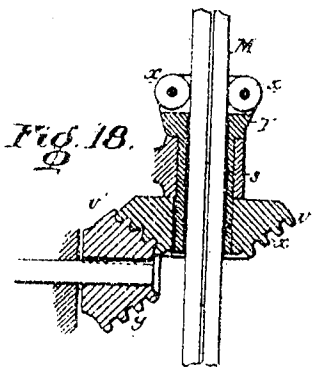
Figure 19:
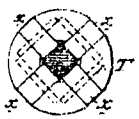
Figure 17:
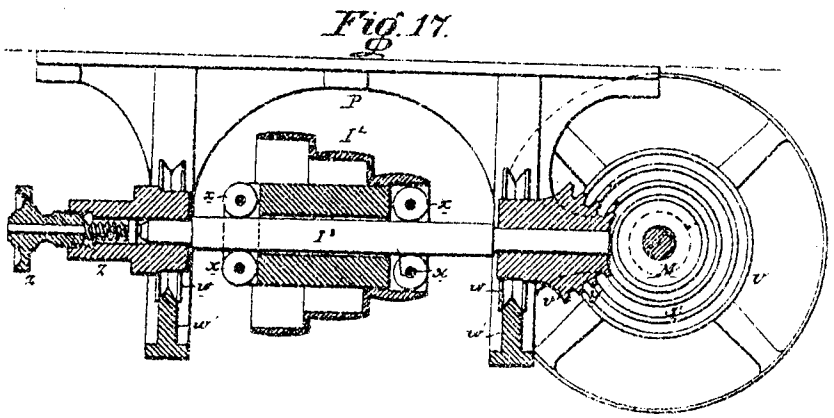

In the accompanying drawing, Figure. 1, Sheet 1, is a transverse vertical section of my improved machine for cutting and shaping metals; Figs. 2 and 3, Sheet 1, enlarged views of a part of Fig. 1; Fig. 4, Sheet 2, a plan view of the machine; Fig. 5, Sheet 2, an enlarged sectional plan-view of part of the machine; Fig. 6, Sheet 2, a detached view of part of one end of the machine; Fig. 7, Sheet 3, a transverse vertical section on the line 1 2, Fig. 4; Fig. 8, Sheet 3, a transverse section on the line 3 4, Fig. 4; Figs. 9, 10, 11, 12, 13, and 14, Sheet 3, detached views of parts of the machine. Fig. 15, Sheet 4, is a plan view of the hanger, squared line-shaft, and traveling carriage, from which power is transmitted to the machine; Fig. 16, Sheet 5, a side view of Fig. 15. Fig. 17, Sheet 5, is a transverse section of the same on the line 5 6; and Figs. 18 and 19, Sheet 5, are detached views.

A represents the cast-iron bed of the machine; B, a movable table attached to the front of the same; and H and H′, a head-stock and carriage at the rear. The table B, which is intended to carry the object or objects to be operated upon, is arranged to move vertically, and the head-stock H is furnished with a revolving spindle, and is arranged to be moved both longitudinally and transversely. All or any of these movements can be imparted to the table and head-stock by hand, or automatically, as I will now proceed to describe: The table B has the usual longitudinal slots *a*, for convenience in securing the work to the same by T-headed bolts, in the usual manner, and the vertical portion $a^1$ of the table is adapted to and arranged to slide vertically in V-shaped guides on the bed of the machine. This vertical movement is imparted to the table by a screw-spindle, D, Fig. 1, which has a thread adapted to the internal thread of a nut, $a^2$, secured to the table. At the upper end of the screw-spindle D there is a bevel-wheel, *b*, which gears into a bevel-wheel, $b^1$, on a horizontal shaft, D′, arranged to turn in the bed of the machine, and having at its outer extremity a crank, $b^2$, shown by dotted lines in Fig. 4, by which the said shaft can be turned. The shaft D′ has also, within a casing, E, at one end of the machine, a cog-wheel, $b^3$, Figs 4 and 7, which gears into a pinion, *c*, hung to a lever, E′, Fig. 7, by the operation of which the said pinion can be thrown in or out of gear. This lever has, at its outer end, a spring-latch, *d*, adapted to the notched segmental plate $d^1$ on the casing E, by which the said lever can be locked and prevented from moving, when adjusted. (See Figs. 7 and 8.) The pinion *c* turns loosely upon a short spindle, $d^2$, on which is also hung loosely a cog-wheel, *c′*, of considerably larger diameter than the pinion *c*. The latter and the cog-wheel may turn independently of each other, or may be forced tightly together by means of a nut on the spindle, so as to cause them to turn simultaneously. The pinion *c* gears into a cog-wheel, *e*, which can slide to a limited extent upon, but is prevented from turning independently of, a shaft, F, which has a screw-thread throughout the greater portion of its length and forms part of the longitudinal feed-motion of the carriage H′. There is also upon the screw-shaft F, adjacent to the cog-wheel *e*, a pinion, $f^1$, and a cog-wheel, *f*, which are secured together, but hung loosely upon the shaft, so that they may turn independently of the cog-wheel *e*. The latter can, however, by means of a nut, *e′*, be forced tightly against the pinion, so as to be driven by the latter, in order to turn the screw-shaft. The pinion $f^1$ gears into the cog-wheel *c′*, before referred to, and the cog-wheel *f*, by which the pinion is driven, receives its motion through the medium of one of two small pinions, *g g′*, hung to a movable disk, *h*, from a fixed cog-wheel, *i*, on the driving-pulley G of the machine, the said pulley G being driven by a cone-pulley, R, on a shaft above, as hereinafter explained.

By means of the above-described mechanism the table B may be lowered, by a motion of the driving-shaft in the direction of the arrow, Figs. 7 and 8, and in order to raise the said table by the same motion of the driving-shaft, the direction of the motion of the train of wheels must be reversed, by so adjusting the disk *h* as to throw the pinion *g′* into gear with the cog-wheel *f*, and thus interpose two pinions between the latter and the cog-wheel *i* on the driving-shaft, instead of one only, as before described.

The head-stock H is adapted to the carriage H′, which is arranged to slide upon guides *j′* on the bed of the machine, and the head-stock carries a spindle, I, with a cone-pulley, I′, and is arranged to slide transversely from or toward the table B upon guides *j* on the carriage H′. The carriage H′ with its head-stock may be caused to traverse the guides *j* by manipulating a crank, *k*, Fig. 4, on a spindle, $k^1$, which has at its opposite extremity a cog-wheel, $k^2$, gearing into a rack, $k^3$, on the bed of the machine; or the said carriage and head-stock may be caused to slide automatically and in either direction upon the guides *j* by means of the screw-shaft F, before referred to, which gears into a half nut, F′, on the carriage H′, as shown in Figs. 1 and 5, the said nut being so controlled by a screw-spindle, *l*, having threads of a coarse pitch, that it can be readily drawn back from the screw F when it is desired to operate the carriage by hand.

This screw-spindle $l$ is provided with an operating-handle, $l$, the weight at the end of which tends to maintain the half nut in the position to which it may be adjusted. The head-stock can always be operated, either automatically or by hand, through the medium of a screw-spindle, J, and nut J′, Fig. 1. The spindle J turns in the carriage H′, and has at its inner end a worm-wheel, $m$, gearing into a worm, $m^1$, which is arranged to slide upon but not to turn independently of a shaft, G′, which forms a continuation of, and one end of which passes through the tubular driving-shaft G. (See Fig. 9.) The worm-wheel $m$ is hung loosely to the screw-spindle J, but is adapted to a clutch, $m^2$, Figs. 2 and 3, on the squared end of the spindle, and is controlled by a casing, $n$, which entirely incloses the worm-wheel. Projecting from and forming part of this casing is a nut, $n^1$, to which is adapted a coarse screw-thread, $n^2$, on a rod, $n^3$, in such a manner as to push the said casing outward, and thus disengage the clutch from the worm-wheel when the screw-spindle J is to be turned by hand, or to draw it inward and again cause the clutch to engage with the worm-wheel, when the screw-spindle is to be operated by power, this rod $n^3$ terminating in a knob at the rear of the head-stock.

The reversing mechanism or devices for operating the disk $h$, automatically or by hand, so as to throw either of the pinions $g$ or $g'$ into gear with the cog-wheel $f$, or both out of gear, forms an important feature of my invention, and may be described as follows: The shaft G′ has a longitudinal slot or groove, $o$, which permits the worm $m^1$ to slide upon, but not to turn independently of the said shaft, as before mentioned, and at one end of the bed of the machine there is an adjustable latch, $o'$, Fig. Fig. 6, the point of which can be extended into the said groove $o$, in order to prevent the shaft from turning without interfering with any longitudinal movement that may be imparted to the same by the carriage H′, which, as it reciprocates upon the guides $j$, is arranged to strike successively adjustable stops $p$ and $p^1$ secured to the said shaft by set-screws or otherwise. This longitudinal movement of the shaft G′ through the tubular driving-shaft is only permitted when a nut, $p^2$, at the end of the said shaft, which nut has a sleeve extending into a recess in the driving-pulley, is drawn back or loosened, as shown in Fig. 9, and the said nut must be tightened to clamp the driving-pulley between the nut and the shoulder $i^3$ on the shaft G, when it is desired to rotate the latter with the driving-pulley. The disk $h$ vibrates upon a sleeve, K, which is fitted loosely upon the shaft G′, and is contained within a casing, L, which is secured to the bed of the machine. The said sleeve is prevented from sliding with the shaft G′ in either direction by a nut, $q$, which is in contact with the end of the casing, and by a disk, $k^1$, contained within the said casing adjacent present instance, the nut $e'$ is tightened, the nut $p^2$ at the end of the shaft G′ is loosened, and the latter is secured, by a catch, $o'$, so as to prevent it from turning, after which the stops $p$ and $p^1$ are properly adjusted, and the machine is set in motion.

The head-stock carrying the planing-tool No. 4 will first be carried in one direction until it strikes one of the stops of the shaft G′, which, as before explained, will have the effect of reversing the motion, and the head-stock will then be moved in the opposite direction. The table is then raised or lowered, as required, in order to present another portion of the surface of the block to the action of the tool, the latter moving backward and forward, as the motion of the head-stock is reversed, until the entire surface has been planed.

For horizontal drilling it will be only necessary to move the head-stock H on the carriage H′ forward, either automatically or by hand, toward the object secured upon the table. When the head-stock is to be moved automatically, however, the nut $p^2$ must be tightened, in order that the shaft G may be rotated by the tubular driving-shaft.

In slotting, a revoving tool is used, and the table B, or the head-stock, or both, will have to be moved, either automatically or by hand, as the slot is vertical, horizontal, diagonal, or angular. For cutting the teeth of cog-wheels a revolving tooth is used also, and the wheel is secured in a horizontal position upon the table, to which a vertical reciprocating motion is imparted. The wheel, thus placed upon the table, should be secured to, and be controlled by, appropriate mechanism for determining the number of teeth, and the proper distances between the same.

I have devised an arrangement for this purpose, which forms the subject of a separate patent. The machine can also be used for cutting key-seats in pulleys without removing the latter from the position in which they are secured upon the table, in order to be turned out inside. For this purpose a special tool is required, which, as it also forms the subject of a separate patent, will require no description here.

I claim as my invention—

1. The combination, in a cutting and shaping machine, of a carriage, H′, admitting of a longitudinal movement on the bed, with the tool-carrying head-stock H, admitting of a transverse movement on the said carriage, and a work-supporting table, B, admitting of a vertical movement on the bed, all substantially as set forth.

2. The sliding head-stock H, its spindle I, and pulley $I^1$, in combination with the carriage H′, the counter-shaft $I^3$, moving laterally with the said carriage, and the driving-pulley $I^2$, sliding on the said counter-shaft.

3. The carriage H′, head-stock H, and screw J, in combination with the shaft G′ and worm $m^1$, and with the worm-wheel $m$, screw J, clutch $m^2$, and screw-rod $n^3$, substantially as described.

4. The vertically-adjustable table B, and the nut $a^2$, vertical screw D, gears $b$ $b^1$, and shaft D′, in combination with the driving-pinion $i$, adjustable disk $h$, carrying the pinions $g$ $g'$ and gear-wheels $b^3$, $f$, and $c'$, and pinions $f$, $c$, and $e$, substantially as described.

5. The shaft G′, admitting of a limited longitudinal movement, in combination with the sleeve K, carrying a notched disk, K′, and having a spiral slot, into which projects a pin on the shaft G′, with a disk, $h$, having a slot, $s^1$, and carrying independent pinions $g$ $g'$, and with an arm, L′, carrying a slide on which are two pins, one adapted to a notch in the disk K′, and the other to the slot $s^1$, so that the longitudinal movement of the shaft G′ is made the means of turning the disk $h$, and moving one of the pinions $g$ $g'$ into gear with the wheel $f$.

6. The combination of the arm L′, having cam-like projections $t^2$ $t^2$ at its lower end, the notched disk $h$, carrying pinions $g$ $g'$, and pawl-catches $t$ $t$, adapted to the notches in the disk $h$, and operated by the cam end of the arm L′, for the purpose described.

7. The combination of the arm L′, having projections $t^2$ $t^2$, the pawl-catches $t$ $t$, and adjustable projections $t^3$ $t^3$, substantially as and for the purpose described.

8. The frame S, having wheels $r$ running on ways $w'$, and carrying a rotating counter-shaft, $I^3$, on which slides a pulley, $I^2$, in combination with the driving-shaft M and gears V V′, or equivalent devices, for imparting a rotary motion to the counter-shaft, and with a shaft, I, rotating in a stock which travels horizontally in two directions at right angles to each other, substantially as set forth.

In testimony whereof I have signed my name to this specification in the presence of two subscribing witnesses.

C. VAN HAAGEN.

Witnesses:

WM. A. STEEL,

HARRY SMITH.